(12) United States Patent
Lakka et al.

(10) Patent No.:  US 12,567,062 B2
(45) Date of Patent:  *Mar. 3, 2026

(54) SYSTEMS AND METHODS FOR USE IN AUTHENTICATING USERS IN CONNECTION WITH NETWORK TRANSACTIONS

(71) Applicant: MASTERCARD INTERNATIONAL INCORPORATED, Purchase, NY (US)

(72) Inventors: Sowmya Reddy Lakka, Wildwood, MO (US); Brian Piel, Ballwin, MO (US); Vincenzo Palomba, London (GB); Jonathan James Main, Hook (GB); David Anthony Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/387,440

(22) Filed: Nov. 6, 2023

(65) Prior Publication Data

US 2024/0112182 A1     Apr. 4, 2024

Related U.S. Application Data

(63) Continuation of application No. 17/391,667, filed on Aug. 2, 2021, now Pat. No. 11,810,107, which is a (Continued)

(51) Int. Cl.
*G06Q 20/38* (2012.01)
*G06Q 20/04* (2012.01)
(Continued)

(52) U.S. Cl.
CPC ........... *G06Q 20/385* (2013.01); *G06Q 20/04* (2013.01); *G06Q 20/12* (2013.01); *G06Q 20/38215* (2013.01); *G06Q 20/401* (2013.01)

(58) Field of Classification Search
CPC .... G06Q 20/385; G06Q 20/401; G06Q 20/04; G06Q 20/12
(Continued)

(56) References Cited

U.S. PATENT DOCUMENTS 5,809,144 A      9/1998  Sirbu et al.
7,653,602 B2*   1/2010  Davis ..................... G06Q 20/02
705/64

(Continued)

FOREIGN PATENT DOCUMENTS

CA      3034657      3/2018
CN    105612543      5/2016
(Continued)

OTHER PUBLICATIONS

K. Ren, Wenjing Lou, Kwangjo Kim and R. Deng, "A novel privacy preserving authentication and access control scheme for pervasive computing environments," in IEEE Transactions on Vehicular Technology, vol. 55, No. 4, pp. 1373-1384, Jul. 2006. (Year: 2006).*

(Continued)

*Primary Examiner* — Virpi H Kanervo
(74) *Attorney, Agent, or Firm* — Harness, Dickey & Pierce, P.L.C.

(57) ABSTRACT

Systems and methods are provided for authenticating users. An exemplary method includes receiving, by a directory server (DS), an authentication request for a transaction to an account where the request includes a token and a cryptogram, and transmitting the token and cryptogram to a digital service server (DSS). The method also includes mapping, by the DSS, the token to an account number for the account, validating the cryptogram, generating a directory server nonce (DSN) for the request, and transmitting the DSN and the account number to the DS. The method further includes transmitting, by the DS, the DSN and the account number to (Continued)

an access control server (ACS) associated with an issuer of the account and, in response to an issuer authentication value (IAV), compiling an accountholder authentication value (AAV) including the IAV, the DSN and an amount of the transaction and transmitting the AAV to a merchant or server.

17 Claims, 4 Drawing Sheets

Related U.S. Application Data continuation of application No. 15/725,893, filed on Oct. 5, 2017, now Pat. No. 11,080,697.

(51) Int. Cl.
G06Q 20/12 (2012.01)
G06Q 20/40 (2012.01)

(58) Field of Classification Search
USPC ........................................................ 705/44
See application file for complete search history.

(56) References Cited

U.S. PATENT DOCUMENTS

| | | | | |
|---|---|---|---|---|
| 9,972,011 | B2 * | 5/2018 | Hey | G06Q 20/4016 |
| 11,810,107 | B2 | 11/2023 | Lakka et al. | |
| 2003/0014247 | A1 | 1/2003 | Ng et al. | |
| 2004/0254848 | A1 * | 12/2004 | Golan | G06Q 20/12 |
| | | | | 705/26.1 |
| 2008/0154770 | A1 | 6/2008 | Rutherford et al. | |
| 2011/0191247 | A1 * | 8/2011 | Dominguez | G06Q 20/4014 |
| | | | | 705/317 |
| 2011/0196791 | A1 | 8/2011 | Dominguez | |
| 2011/0208658 | A1 * | 8/2011 | Makhotin | G06Q 20/401 |
| | | | | 235/380 |
| 2011/0208659 | A1 * | 8/2011 | Easterly | G06Q 20/3274 |
| | | | | 705/79 |
| 2012/0018506 | A1 | 1/2012 | Hammad et al. | |
| 2012/0284187 | A1 | 11/2012 | Hammad et al. | |
| 2014/0008434 | A1 * | 1/2014 | de Geer | G07F 7/125 |
| | | | | 235/380 |
| 2014/0108262 | A1 | 4/2014 | Plateaux et al. | |
| 2014/0201079 | A1 * | 7/2014 | Kavanagh | G06Q 20/34 |
| | | | | 705/44 |
| 2015/0006426 | A1 | 1/2015 | Sobhani et al. | |
| 2015/0081551 | A1 | 3/2015 | Yu | |
| 2015/0112870 | A1 | 4/2015 | Nagasundaram et al. | |
| 2015/0161602 | A1 | 6/2015 | Guiney | |
| 2015/0161608 | A1 | 6/2015 | Gilbert et al. | |
| 2015/0317630 | A1 | 11/2015 | Piel et al. | |
| 2015/0317632 | A1 | 11/2015 | Park et al. | |
| 2016/0140558 | A1 | 5/2016 | Groarke et al. | |
| 2016/0180343 | A1 | 6/2016 | Poon et al. | |
| 2016/0232527 | A1 | 8/2016 | Patterson | |
| 2016/0301683 | A1 | 10/2016 | Laxminarayanan et al. | |
| 2016/0321652 | A1 | 11/2016 | Dimmick et al. | |
| 2017/0069003 | A1 | 3/2017 | Barta et al. | |
| 2017/0083720 | A1 | 3/2017 | Roever et al. | |
| 2017/0083914 | A1 | 3/2017 | Baker et al. | |
| 2017/0091772 | A1 | 3/2017 | Piel et al. | |
| 2017/0330187 | A1 | 11/2017 | Kohli | |
| 2017/0373852 | A1 | 12/2017 | Cassin et al. | |
| 2018/0007035 | A1 | 1/2018 | Zhang et al. | |
| 2018/0039966 | A1 * | 2/2018 | Gill | G06Q 20/401 |
| 2019/0108515 | A1 | 4/2019 | Lakka et al. | |

FOREIGN PATENT DOCUMENTS

| | | | | |
|---|---|---|---|---|
| CN | 105745678 | | 7/2016 | |
| CN | 105814592 | | 7/2016 | |
| CN | 105874495 | | 8/2016 | |
| EP | 1636680 | B1 | 4/2016 | |
| JP | 2006-527430 | | 11/2006 | |
| JP | 2015-194796 | | 11/2015 | |
| RU | 114800 | U1 | 4/2012 | |
| RU | 2587423 | C2 | 6/2016 | |
| RU | 2595885 | C2 | 8/2016 | |
| WO | WO-0184509 | | 11/2001 | |
| WO | WO02/071176 | | 9/2002 | |
| WO | WO2002/071179 | | 9/2002 | |
| WO | WO-02071176 | A2 * | 9/2002 | G06Q 20/24 |
| WO | WO2013/045898 | | 4/2013 | |

OTHER PUBLICATIONS

Alliance, Smart Card. "Technologies for payment fraud prevention: EMV, encryption and tokenization." Pub. No. PC-14002 (Oct. 2014). (Year: 2014).*

Crowe, Marianne, et al. "Is Payment Tokenization Ready for Primetime?. " Jun. 11, 2015: 1-51. (Year: 2015).*

Mattsson, Ulf T. "Analyzing the Security, Compliance and Cost Benefits of Tokenization." Compliance and Cost Benefits of Tokenization (Apr. 30, 2009). (Year: 2009).*

Qi Xie, Jun Zhan and Na Dong. Robust Anonymous Authentication Scheme for Telecare Medical Information Systems. J Med Syst (2013) 37:9911. (Year: 2013).

J. Meng and L. Ye, "Secure Mobile Payment Model Based on WAP," 2008 4th International Conference on Wireless Communications, Networking and Mobile Computing, Dalian, China, 2008. (Year: 2008).

Z. Z. Hosseini and E. Barkhordari, "Enhancement of security with the help of real time authentication and one time password in e-commerce transactions," The 5th Conference on Information and Knowledge Technology, Shiraz, Iran, 2013, pp. 268-273. (Year: 2013).

J. Tellez Isaac and Z. Sherali, "Secure Mobile Payment Systems," in IT Professional, vol. 16, No. 3, pp. 36-43, May-Jun. 2014. (Year: 2014).

Y. Wang, C. Halm and K. Sutrave, "Mobile payment security, threats, and challenges," 2016 Second International Conference on Mobile and Secure Services (MobiSecServ), Gainesville, FL, USA, 2016, pp. 1-5. (Year: 2016).

Ismaili et al. A Secure Electronic Transaction Payment Protocol Design and Implementation. (IJACSA) International Journal of Advanced Computer Science and Applications, vol. 5, No. 5, pp. 172-180 (2014). (Year: 2014).

* cited by examiner

SYSTEMS AND METHODS FOR USE IN AUTHENTICATING USERS IN CONNECTION WITH NETWORK TRANSACTIONS

CROSS-REFERENCE TO RELATED APPLICATIONS

This application is a continuation of U.S. patent application Ser. No. 17/391,667, filed on Aug. 2, 2021, which is a continuation of U.S. patent application Ser. No. 15/725,893, filed on Oct. 5, 2017 (now U.S. Pat. No. 11,080,697 issued Aug. 3, 2021). The entire disclosure of each of the above applications is incorporated herein by reference.

FIELD

The present disclosure generally relates to systems and methods for use in authenticating users in connection with network transactions and, in particular, to systems and methods for use in providing authentication values for transactions by users, in connection with tokenization services, where the authentication values are based on authentication of the users and validation codes for cryptograms associated with the transactions.

BACKGROUND

This section provides background information related to the present disclosure which is not necessarily prior art.

Payment account transactions typically involve payment accounts associated with consumers, where the payment accounts are used to fund purchases of one or more products. In connection therewith, various mechanisms are often provided to inhibit and/or prevent fraudulent or unauthorized transactions. For example, EMV technology has been employed where chips included in payment cards, used to perform the payment account transactions, cooperate with point-of-sale (POS) terminals to generate cryptograms for the transactions, which are then validated prior to approval of the transactions by issuers of the corresponding payment accounts (or by parties on behalf of the issuers). While usually designed for card present transactions, EMV technology is suitable for use in online transactions as well.

In addition to the above, payment networks also often provide enhanced authentication techniques, commonly referred to as 3-D Secure™ protocol, which rely on merchant plug-ins, or MPIs, at merchants involved in the payment account transactions, and on access control servers, or ACSs, associated with the issuers. The 3-D Secure™ protocol is commonly employed for online transactions to permit cardholders to authenticate themselves when they are not physically present at the merchants, when performing the transactions. As an example, Mastercard® provides the Mastercard SecureCode™ service, which is based on the 3-D Secure™ protocol. Within this service, authentication values (e.g., accountholder authentication values or AAVs, etc.) are generated by card issuers and include results of authentication. These values are then placed into a particular field in authorization messages for the underlying transactions, known as the universal cardholder authentication field, or UCAF. In turn, this information is communicated to support the issuers in connection with payment authorization requests and to provide explicit evidence that authentication was completed by the issuers. Other payment networks utilize similar authentication services, which are generally based on the 3-D Secure™ protocol. And, each of these services typically requires the merchants' acquirers (or banks) to add the resulting authentication values into their standard authorization messages.

DRAWINGS

The drawings described herein are for illustrative purposes only of selected embodiments and not all possible implementations, and are not intended to limit the scope of the present disclosure:

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Payment accounts are widely used by consumers to fund transactions for products at merchants (e.g., transactions for goods, services, etc.). To avoid issues related to fraudulent and/or unauthorized transactions, issuers associated with the payment accounts and payment networks associated with processing the transactions often impose added authentication and validation techniques/services for the consumers initiating the transactions. Traditionally, though, such authentication and validation techniques are only utilized in card-present transactions.

With that said, the systems and methods herein uniquely permit different ones of the added authentication and validation techniques to be utilized for e-commerce transactions, which are more generally card-not-present, or CNP, transactions. In particular herein, when an authentication request is received at a directory server for a given transaction, the directory server provides a token and (optionally) a cryptogram, as included in the request, to a digital service server, or DSS, which maps the token to a primary account number (PAN) associated with the corresponding payment account used in the transaction, and further either validates the cryptogram or stores it securely for later validation and generates a validation code. The directory server then communicates the request (with the PAN) to an access control server, or ACS, which provides an Issuer Authentication Value (IAV) code for the transaction after authentication of the consumer initiating the transaction. The IAV is then compiled into a full accountholder authentication value, or AAV, for the transaction, along with another cryptogram (e.g., a message authentication code (MAC), etc.), and is provided to the merchant for inclusion in an authorization request for the transaction at a specified location therein (e.g., at a universal cardholder authentication field, or UCAF, of the authorization request; etc.). In connection with the authorization request, the payment network validates the cryptogram in the AAV, and based on such validation permits the transaction to proceed, or not. In this manner, both the enhanced authentication provided through the ACS and the security provided by the cryptogram are imposed on the given transaction by the directory server (e.g., as part of the payment network involved in validating the cryptogram, etc.).

Figure 1:
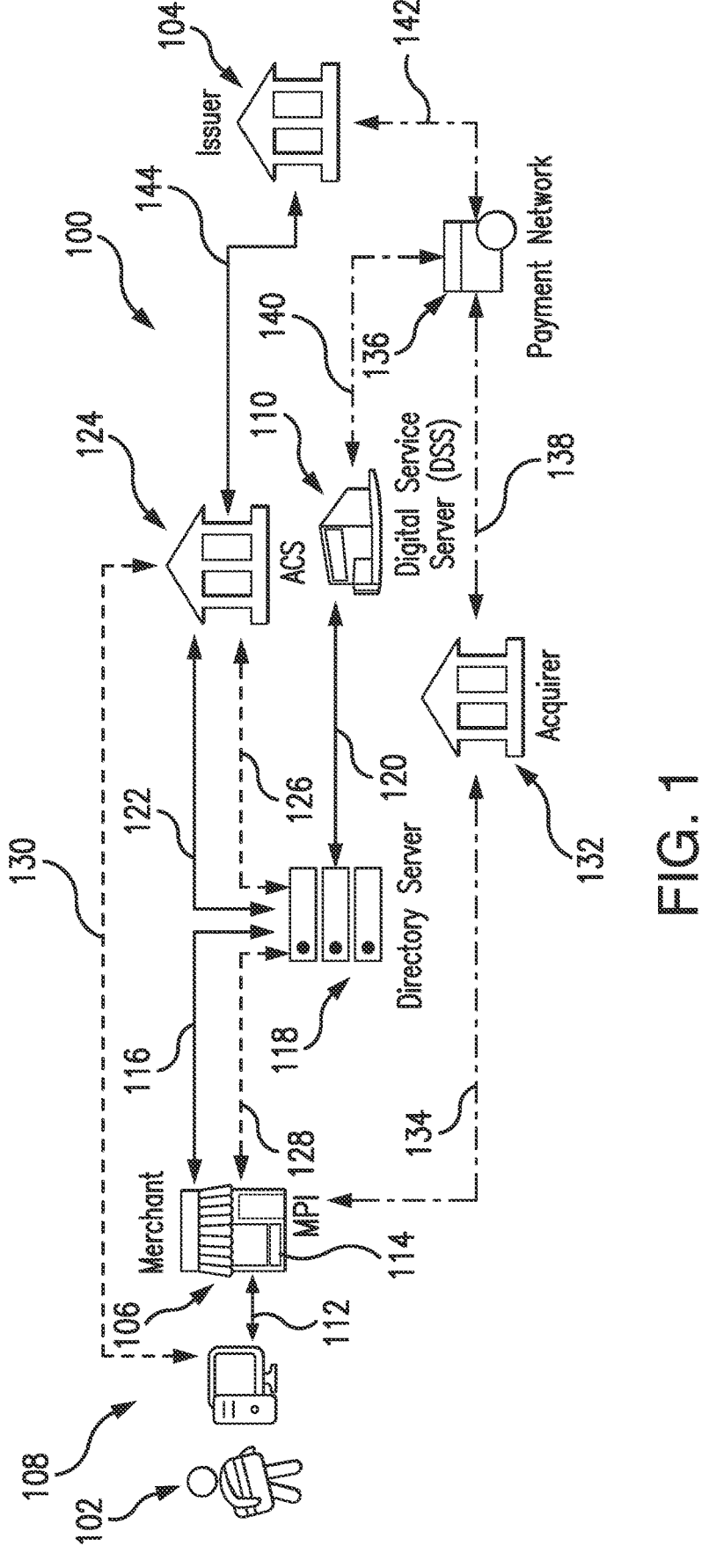
FIG. 1 illustrates an exemplary system for use in providing full accountholder authentication values (AAVs) for transactions, based on authentication of consumers in connection with the transactions and based on validation codes for associated cryptograms, and including one or more aspects of the present disclosure.

FIG. 1 illustrates an exemplary system 100 for implementing a process that may be utilized for authenticating and verifying a consumer in connection with a transaction by the consumer, and which is consistent with the EMV® 3-D Secure™ protocol/specification, for example. It should be appreciated, however, that not all details of the EMV® 3-D Secure™ protocol/specification are discussed herein, since a complete detailed disclosure of such information may be readily understood by referencing the EMV® 3-D Secure™ protocol/specification and or discussions thereof. In addition, the illustrated system 100 includes a plurality of entities that interact with each other by exchanging multiple, specifically formatted messages over secure communication channels (e.g., as defined in the EMV® 3-D Secure™ protocol/specification (see, e.g., https://www.emvco.com/emv-technologies/3d-secure/), etc.). Accordingly, and as can be appreciated, the authentication illustrated in FIG. 1 is complex given the number and extent of entities, messages, and other requirements necessarily involved.

In the illustrated embodiment, the system 100 includes a consumer 102 associated with a payment account, where the payment account is issued to the consumer 102 by an issuer 104 and is useable by the consumer 102 to fund purchase transactions with one or more merchants (e.g., merchant 106, etc.). The consumer 102 is also associated with a computing device 108, which is configured to access one or more virtual merchant locations. The computing device 108 may include, for example, a tablet, a smartphone, a laptop, a desktop, or other device, which enables the consumer 102 to interact and/or communicate with the one or more merchants (e.g., via websites and/or network-based applications provided by the merchants, etc.). Also, the computing device 108 includes a wallet application (not shown), which is configured to provide payment account credentials for the consumer's payment account, for example, in connection with payment account transactions. In this embodiment, the wallet application includes a virtual wallet application, which may include, without limitation, Masterpass® from Mastercard®, Apple Pay® from Apple®, Visa Checkout®, etc. Upon installation and/or activation, the wallet application, and more generally, the computing device 108, is provided with and/or provisioned with a public/private key pair or one or more symmetric keys for use as described below, to generate cryptograms per transaction performed by the consumer 102 using his/her payment account (through the wallet application). The keys may be provided by a digital service server (DSS) (e.g., DSS 110, etc.), or a payment network (e.g., payment network 136, etc.), or otherwise, etc. Details of the computing device 108 and other computing devices identified herein (e.g., servers, etc.) are described more fully below, with reference to FIG. 2.

The merchant 106 in the system 100 includes, in this exemplary embodiment, a virtual merchant having a virtual merchant location, such as, for example, a website, a network-based application, etc., which is accessible by the consumer 102 via the computing device 108. The merchant virtual location may be managed and/or provided directly by the merchant 106, or by another entity on behalf of the merchant 106, etc.

In general in the system 100, the consumer 102 has previously accessed and/or interacted with the merchant 106 at the virtual merchant location, whereby the merchant 106 includes a profile for the consumer 102, which includes payment credentials for the consumer's payment account. In connection therewith, the merchant 106, or other entity, is configured to request a token from DSS 110 (e.g., which may be embodied in and/or include a token service provider (TSP), etc.) in connection with generating the profile for the consumer 102, for example, for later use in connection with a payment account transaction by the consumer 102 at the merchant 106. The DSS 110 includes, in this exemplary embodiment, the Mastercard™ Digital Enablement Service (MDES) server, but may include one or more other servers in other embodiments, etc. In any case, in response to such token request, the DSS 110 generates the token specific to the consumer's payment account and maps the token to a primary account number (PAN) for the payment account (e.g., in a data structure associated with the DSS 110, etc.). The DSS 110 further returns the token to the merchant 106, directly or via the virtual wallet application at the computing device 108, whereby the merchant 106 then stores the token in association with the consumer's profile for later use by the consumer 102 in future transactions with the merchant 106 (e.g., "on file," etc.). For subsequent transactions with the consumer 102, the merchant 106 may then use the token to identify the funding payment account for the transaction.

Alternatively, the DSS 110 may generate and provide a token to the virtual wallet application in the computing device 108, which in turn, stores the token therein. Then, for a subsequent transaction, the virtual wallet application provides the token as stored therein, rather than relying on the token "on-file" at the merchant 106. Further, for subsequent transactions, the consumer 102, or the virtual wallet application in the computing device 108, may directly provide an account number (e.g., a PAN, etc.) to fund the further transaction, instead of relying on the token "on-file" at the merchant 106 or the token provisioned to the virtual wallet application.

As such, transactions between the consumer 102 and the merchant 106 may include one or more tokens, or an account number (e.g., a PAN, etc.) provided by the consumer 102. Each type of transaction is processed as described below, albeit somewhat differently, as indicated.

Specifically, in the system 100, when the consumer 102 browses one or more products (e.g., goods, services, etc.) at the merchant 106, via the computing device 108 and at the merchant's virtual location, the consumer 102 may select to purchase a product and further provide details related to the transaction and an input at the computing device 108 to then checkout, via path 112. The checkout details and input, received from the consumer 102, may include, for example, a selection of the payment account corresponding to the token already received and stored at the merchant 106. Or, the checkout details and input may include the consumer 102 providing a token, an account number for the same payment account (for which the token has already been received), or an account number for a different payment account, and/or other details of the transaction.

In response to the checkout input (and/or details provided in connection therewith), the merchant 106 is configured to interact with the computing device 108, whereby the computing device 108, as configured by the wallet application (not shown), generates a cryptogram based on the public-private key pair, or on the symmetric key (e.g., a secret key generated by a symmetric algorithm, etc.), which is associated with the consumer's payment account and wallet application (and known to or shared with the DSS 110, for example). The cryptogram may be generated by the virtual wallet application, locally at the computing device 108 (e.g., a digital secure remote payment (DSRP) generated by the wallet), or it may be generated based on one or more interactions with other systems (e.g., a digital secure remote payment (DSRP) service incorporated into the DSS 110, or other system(s), etc.) (e.g., via cloud service(s), etc.) and provided to the merchant 106 via the virtual wallet application. In this exemplary embodiment, the cryptogram is a token cryptogram, and specifically, is a DSRP cryptogram. That said, however, it should be appreciated that other token cryptograms may be generated and/or employed in other system embodiments.

The computing device 108, as configured by the wallet application, then transmits the DSRP cryptogram to the merchant 106.

In addition, the wallet application (either locally at the computing device 108 or at one or more backend servers) maintains an application transaction count (ATC) and increments the ATC for every DSRP cryptogram generated for the consumer's payment account (i.e., either specific to the token for the payment account, or not). In the illustrated embodiment, the ATC is specific to the token, whereby even when a payment account has multiple tokens, each of the tokens would be associated with a particular ATC, for example, to inhibit reply attacks associated therewith.

When the DSRP cryptogram is received at the merchant 106, a merchant server plug-in (MPI) 114 associated with the merchant 106 is configured to compile an authentication request (AReq) for the transaction. When the transaction involves a token provisioned to the merchant 106, the AReq includes at least the token and the DSRP cryptogram received from the computing device 108. Alternately, when the transaction does not include the token (or other token), the AReq includes at least an account number for the consumer's payment account, such as, for example, the PAN, etc., and the DSRP cryptogram. The MPI 114 is configured to then transmit the AReq, via path 116, to a directory server 118 included in the system 100. While the exemplary system 100 includes the MPI 114, it should be appreciated that the MPI 114 may be one or more other servers and/or services as is suitable to the particular enhanced authentication included herein (e.g., whereby the MPI 114 may be referred to as a 3DS server (for EMV 3DS specification), etc.), or otherwise.

In this exemplary embodiment, when the AReq includes the token provisioned to the merchant 106, the directory server 118 is configured to receive the AReq and to transmit the token and the DSRP cryptogram, from the AReq, to the DSS 110, via path 120.

The DSS 110, in turn, is configured to map the received token to the account number (e.g., the PAN, etc.) for the consumer's payment account and to generate to a directory server nonce (DSN). The DSN may include a number, for example, an unpredictable number, utilized to provide entropy into the AAV and/or an issuer authentication value (IAV) associated therewith. In addition, the DSS 110 is configured to validate the received DSRP cryptogram for the transaction (i.e., perform a cryptographic key validation). Specifically, the DSS 110 is configured to diversify a master key from the issuer master symmetric key (e.g., a key generated, by the DSS 110, for the issuer 104, etc.) and then to diversify one or more session keys from the master key (e.g., based on the ATC maintained by the DSS 110, etc.). The DSS 110 is configured to use the session key(s) to validate the DSRP cryptogram received from the directory server 118. Further, when the cryptogram is validated, the DSS 110 is configured to increment the ATC, for example, by recording the ATC value as a used value (thereby potentially preventing its repeated use), etc. Additionally, or alternatively, when the DSRP cryptogram is not validated, the DSS 110 is configured to store the DSRP data in memory in association with the ATC and/or the DSN (whereby the DSRP cryptogram is validated later, as described below).

The DSS 110 is also configured to return the account number and the DSN back to the directory server 118, again via path 120. In at least one embodiment, for example, where the AReq includes neither a token nor a cryptogram, the directory server 118 may generate the DSN, rather than receiving the DSN from the DSS 110.

Thereafter, when the directory server 118 receives the account number from the DSS 110, or when the original AReq includes the account number, the directory server 118 may be configured to compress certain data associated with the transaction. For example, the directory server 118 may be configured to determine a logarithm of the transaction amount (i.e., a log amount), thereby compressing data used to present the amount (e.g., a six byte value for the amount may be encoded in two bytes with a potential error of less than +/−0.02%, etc.). The directory server 118 may further be configured to determine a truncated hash of the merchant ID for the merchant 106, again, thereby compressing the data used to represent the merchant ID. With that said, it should be appreciated that the directory server 118 may be configured to apply one or more different techniques to compress data to be used herein, or not, in other embodiments.

The directory server 118 is configured to then provide, for example, the AReq, with the account number, the DSN, the log amount, and the truncated hash of the merchant ID, via path 122, to an access control server (ACS) 124 of the system 100. The ACS 124 is a server operated by the issuer 104, or on behalf of the issuer 104, as defined by the 3-D Secure™ specification implemented in this exemplary embodiment.

In this manner, the ACS 124 is configured to assess a risk of the transaction (e.g., based on the amount of the transaction, the merchant type involved, the consumer 102, the consumer's device information (e.g., a recurring device, etc.), etc.). If the risk is not acceptable (based on the above analysis/authentication), the ACS 124 may be configured to further provide a challenge question, consistent with conventional techniques, to authenticate the consumer 102, decline the transaction, or proceed otherwise, etc. When the consumer 102 is authenticated, through the above risk-based assessment, or through the additional challenge question, or otherwise, the ACS 124 is configured to then generate the IAV based on a key(s) shared with the issuer 104, a cryptographic technique (e.g., a keyed hash (HMAC) function, etc.), and one or more of the account number, the DSN, the log amount, and the truncated hash of the merchant ID, or other data, etc. In this manner, for example, the IAV is specific to the consumer 102, the merchant 106 and also the transaction (e.g., by the log amount, etc.), thereby inhibiting, generally, the IAV from being generated for one transaction and submitted in an authorization request for another transaction to the same or different merchant.

The ACS 124 is configured to then transmit the IAV to the directory server 118, again, via path 122, as an authentication response (ARes).

Optionally, the ACS 124 may further authenticate the consumer 102 through a challenge question when the risk based authentication suggests it. In particular, as indicated by the dotted paths in FIG. 1, the ACS 124 may be configured to respond with the ARes to the directory server 118, along path 126, where the ARes further includes a challenge indicator (e.g., a network address to be called by the merchant 106, etc.). In this example, the directory server 118 may be configured to then receive the ARes from the ACS 124 and transmit the ARes to the merchant 106 (via the MPI 114 or 3DS server, etc.), via path 128. In turn, the merchant 106, and in particular, the virtual merchant location (e.g., the website, etc.) may identify the challenge indicator and call or otherwise invoke the challenge, thereby providing interaction, via path 130, between the consumer's computing device 108 and the ACS 124. The interaction generally includes the presentation of a challenge question (e.g., Enter Your Personal Code, etc.), whereupon the consumer 102 provides a response, via path 130. And, the ACS 124 is configured to confirm the response of the consumer 102. Thereafter, when confirmed, the ACS 124 is configured, consistent with the above, to generate the IAV, and then generate a response including the IAV and transmit the response to the directory server 118, via path 126.

Upon receipt of the IAV from the ACS 124, the directory server 118 is configured to generate a message authentication code (MAC) for the full AAV (i.e., the data to be included in the AAV (e.g., the DSN, the log amount, the truncated hash of the merchant ID, a currency code, a key ID, etc.), and then to compile a full AAV. The full AAV includes the IAV, the DSN, the amount and merchant information, and the signature information (e.g., the key ID and the MAC), etc. It should be appreciated that data included in the full AAV may vary based on the particular implementation thereof, whereby the full AAV may include more or less data, but will generally include the IAV from the ACS 124.

Thereafter, the directory server 118 is configured to provide the full AAV to the MPI 114 (or 3DS server), again via path 116.

In turn, the merchant 106 is configured to compile an authorization request for the transaction, which includes the token or the account number for the consumer's payment account, as appropriate, and also the full AAV. The merchant 106 is configured to then transmit the authorization request to acquirer 132, via path 134. The acquirer 132, in turn, is configured to transmit the authorization request to payment network 136, via path 138.

Upon receipt of the authorization request, the payment network 136 may be configured to interact with the DSS 110, via path 140 (although this is not required in all embodiments (e.g. where the payment network 136 knows the appropriate key(s), etc.)). Specifically, the payment network 136 may be configured to validate the MAC included in the full AAV and/or the full AAV itself. The payment network 136 may further be configured to otherwise validate and/or confirm the full AAV, or part thereof, for example, based on version information included in the full AAV.

Once validated, the payment network 136 is configured to provide the authorization request, or parts thereof, to the DSS 110. The DSS 110 is configured to confirm the validation of the DSRP cryptogram based on the DSN, when the DSRP cryptogram was previously validated by the DSS 110. Conversely, the DSS 110 is configured to locate the DSRP data for the transaction, by use of the DSN (or the ATC included therein) and to validate the DSRP data, as described above. In addition, the DSS 110 is also configured to map the token included in the authorization request, if any, to the corresponding account number (e.g., PAN, etc.).

The DSS 110 is configured to then return the account number and a validation result to the payment network 136, via path 140. In connection with the above, the payment network 136 and/or the DSS 110 may be further configured to provide additional services to the transaction based on the payment account and/or the consumer 102. For example, the DSS 110 may be configured to determine if one or more usage requirements of the token is satisfied (e.g., the token is permitted to be used in e-commerce, etc.), or, optionally, to check the transaction amount, name of the merchant, and currency, etc.

Thereafter, the payment network 136 is configured to provide the authorization request (including the account number and the validation result) to the issuer 104, along path 142.

Then, the issuer 104 is configured to determine if the transaction should be approved or declined, and to respond accordingly, through the payment network 136. To do so, the issuer 104 is configured to validate the IAV based on one or more shared key(s) with the ACS 124. The IAV, more specifically, may be validated in the same manner it was generated above, for example, based on a secret key, the same cryptographic technique used by the ACS 124, and the account number, the DSN, the log amount, and the truncated hash of the merchant ID, or other data, etc. Additionally, or alternatively, the issuer 104 may be configured to leverage one or more network services (via the payment network 136, for example) that has already validated the AAV (as indicated by the validation result), in order to approve the transaction. What's more, the issuer 104 may be configured to validate the transaction amount (i.e., the amount indicated in the authorization request) based on the log amount from the AAV (or, optionally, the uncompressed amount), and also the transaction merchant (i.e., the merchant indicated in the authorization request) based on the truncated hash of the merchant ID from the AAV, etc. Once a determination is made, the issuer 104 is configured to transmit an authorization response (including the consumer's account number) back to the payment network 136, along path 142. In turn, the payment network 136 is configured to route the authorization response (including the token or the account number) back to the acquirer 132, via path 138. The acquirer 132, in turn, is configured to provide the authorization response (including the token or the account number) back to the merchant 106, directly or via the MPI 114, along path 134.

At this point, the transaction is approved (in this example) and the merchant 106 may direct the selected product to be delivered to the consumer 102.

Figure 2:
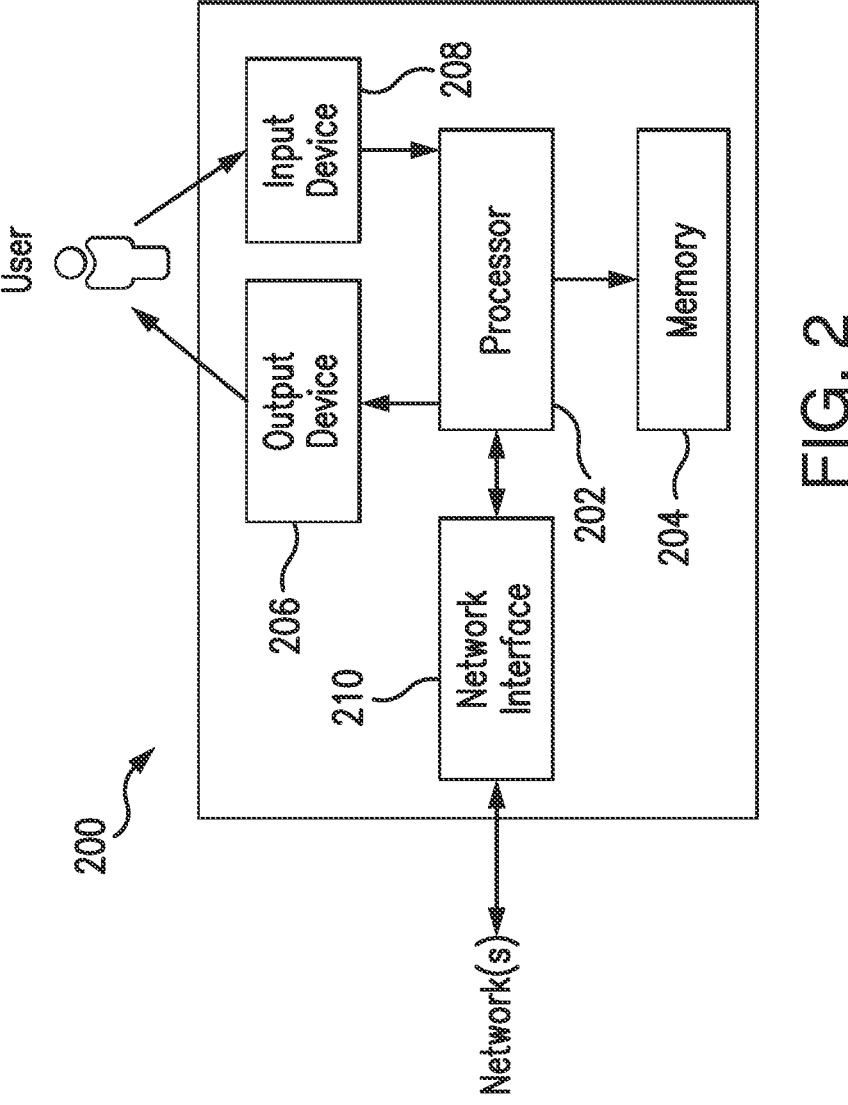
FIG. 2 is a block diagram of an exemplary computing device that may be used in the system of FIG. 1.

It should be appreciated that each of the issuer 104, the merchant 106, the computing device 108, the DSS 110, the MPI 114, the directory server 118, the ACS 124, the acquirer 132, and the payment network 136, etc., are implemented herein in one or more computing devices, such as computing device 200 illustrated in FIG. 2. In connection therewith, the one or more computing devices are each in communication with one or more other entities via at least one network. In general, each of the paths included in FIG. 1, along which, or via which, messages are exchanged in the above description are representative of the network(s). The network(s) may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or even combinations thereof. In one example, a network includes multiple networks, where different ones of the multiple networks are accessible to different ones of the illustrated components in FIG. 1. In particular, the payment network 136 and the DSS 110 may be connected via a private network and, separately, the merchant 106 and the computing device 108 may be connected through a public network, such as the Internet.

FIG. 2 illustrates the exemplary computing device 200, which may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud, fog and/or mist type computing device. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, IAVs, AAVs, authentication requests, keys, MACs, DSRP cryptograms, tokens, account numbers (e.g., PANs, etc.), and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes an output device 206 that is coupled to (and that is in communication with) the processor 202. The output device 206 outputs information, such as confirmations of purchases, challenge questions, etc., visually, for example, to the consumer 102 or other information to other users associated with any of the entities illustrated in FIG. 1, at a respective computing device, etc. The output device 206 may include, without limitation, a liquid crystal display (LCD), a light-emitting diode (LED) display, an organic LED (OLED) display, an "electronic ink" display, speakers, etc. In some embodiments, the output device 206 may include multiple devices.

In addition, the computing device 200 includes an input device 208 that receives inputs from the user (i.e., user inputs) such as, for example, responses to challenge questions, checkout inputs, payment account credentials, etc., from the consumer 102 or other information from other users in the system, etc. The input device 208 may include a single input device or multiple input devices. The input device 208 is coupled to (and is in communication with) the processor 202 and may include, for example, one or more of a keyboard, a pointing device, a mouse, a touch sensitive panel (e.g., a touch pad or a touch screen, etc.), another computing device, and/or an audio input device. Further, in various exemplary embodiments, a touch screen, such as that included in a tablet, a smartphone, or similar device, may behave as both the output device 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks and/or one or more other computing devices herein.

Figure 3:
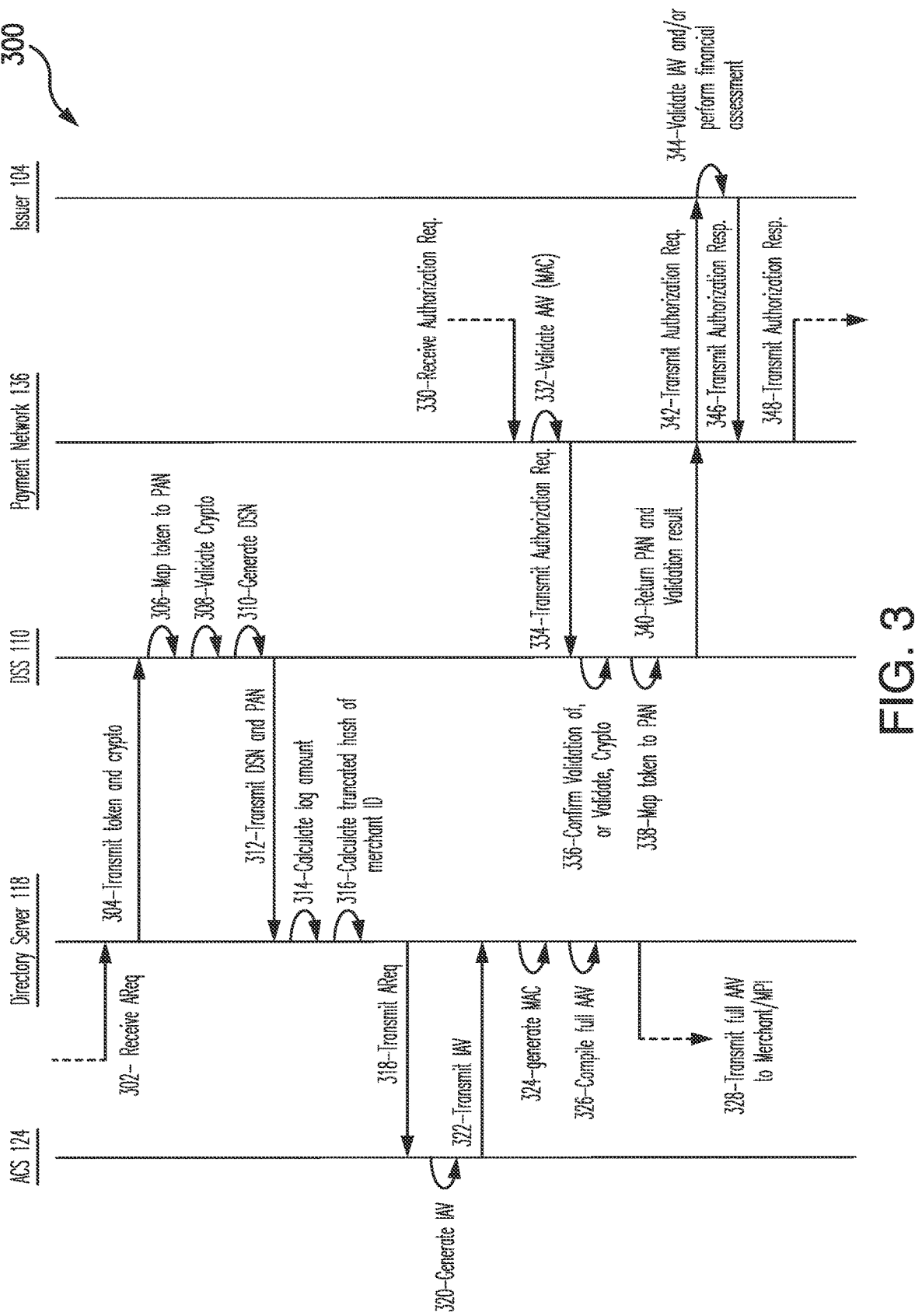
FIG. 3 illustrates an exemplary method that may be implemented via the system of FIG. 1 for use in providing a full AAV, including an issuer authentication value (IAV), for a transaction, based on authentication of a consumer.

FIG. 3 illustrates an exemplary method 300 for providing services for a consumer in connection with a transaction by the consumer at a merchant, and in further combination with enhanced authentication of the consumer. The exemplary method 300 is described (with reference to FIG. 1) as generally implemented in the DSS 110, the directory server 118, and the payment network 136 of the system 100, and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

In the illustrated method 300, for a transaction initiated by the consumer 102 with the merchant 106, the directory server 118 initially receives, at 302, an AReq from the MPI 114 (or 3DS server) associated with the merchant 106. The AReq includes a token, in this exemplary embodiment, for the payment account of the consumer 102 (as used in the transaction), and also a DSRP cryptogram (referred to as a "crypto" in FIG. 3) for the transaction. In response, the directory server 118 transmits, at 304, the token and the DSRP cryptogram to the DSS 110. The directory server 118 does so, in this example, because the token is within a token range (or a BIN range for a PAN) associated with the methods described herein.

The DSS 110, in turn, maps the token to the account number for the consumer's payment account, i.e., the PAN in this example, at 306. And, the DSS 110 also (optionally) validates the DSRP cryptogram, at 308. The validation of the DSRP cryptogram, in this embodiment, is based on the symmetric key, which is shared between the consumer's payment account and/or the wallet application provisioned with the token for the payment account, and the DSS 110. More specifically, the DSS 110 diversifies a master key from the issuer master symmetric key (e.g., generated by the DSS 110 for the issuer 104, etc.) and then diversifies one or more session keys from the master key (e.g., based on the ATC maintained by the DSS 110, etc.). The DSS 110 then employs the session key(s) to validate to the DSRP cryptogram.

Alternatively, rather than validating the DSRP cryptogram, the DSS 110 may store the DSRP cryptogram in memory (e.g., memory 204, etc.) for recall, as described below (e.g., based on the DSN, etc.).

When the DSRP cryptogram validation fails, the DSS 110 responds to the directory server 118 with a transaction failed message, which in turn may be provided back to the merchant 106 and/or MPI 114 (or 3DS server) (whereby the transaction may be halted) or processed otherwise as directed by the issuer 104 (e.g., the issuer 104 may permit the transaction to proceed without validation, etc.). Conversely, when the DSRP cryptogram validation succeeds, the DSS 110 generates, at 310, a DSN. The DSN includes, for example, a concatenation of the ATC, or part thereof (e.g., the least significant byte, etc.), and an unpredictable value (e.g., a randomly generated value, a hash function based on a private key of the DSS 110, or MAC calculation based on the private key, or other suitable value, etc.). While the DSN may be of any suitable length and/or format, in the exemplary embodiment of FIG. 3, the DSN includes a four byte format (i.e., 32 bits) (e.g., the least significant byte of the ATC and three bytes of a randomly generated value, etc.). Notwithstanding the above, optionally, the DSS 110 may generate the DSN, at 310, when the DSRP cryptogram is stored rather than validated, at 308, in the method 300.

When the DSRP cryptogram is validated, at 308, the DSS 110 further designates the ATC as used or "in flight," whereby it may be used moving forward in method 300 in a later authorization request, as provided below, but not for any other purpose (e.g., prevents another AReq with the same DSRP cryptogram, etc.). Then in the method 300, the DSS 110 transmits the DSN and the account number associated with the token, at 312, to the directory server 118.

At 314, the directory server 118 calculates the logarithm of the amount of the transaction (i.e., a log amount) and, at 316, also calculates a truncated hash of the merchant ID (e.g., name and/or location, etc.). While a logarithm of the amount is calculated (e.g., thereby reducing 4-6 bytes representative of the amount down to 2 bytes in the log amount, etc.), it should be appreciated that other techniques may be used in other embodiments to compress the amount, or not. Likewise, the merchant ID may be compressed in other embodiments, or not, by one or more techniques beyond or apart from truncation and/or hashing. In general, however, the compressed amount and merchant ID, if any, will provide data (or space) reduction over providing the uncompressed amount and/or merchant ID.

Thereafter, the directory server 118 transmits the AReq, including the account number for the consumer's payment account, the DSN, the calculated log amount, and truncated hash of the merchant ID to the ACS 124, at 318. In so doing, the directory server 118 identifies the specific ACS 124 based on the consumer's account number and, in particular, based on the BIN of the account number being within a particular range, or based on other indicators included in whole or in part in the AReq. In various embodiments, the AReq may further include a detokenization flag, indicating to the ACS 124 that the AReq includes the account number (as converted by the DSS 110 from the token).

The ACS 124, as described above, will in turn perform a risk-based financial assessment for the transaction, whereby the ACS 124 will authenticate or not authenticate the consumer 102. Optionally, as is conventional, the ACS 124 may use the directory server 118 to initiate a challenge question with the consumer 102, whereby the consumer 102 is authenticated through interaction with the ACS 124. Then, once the consumer 102 is authenticated, regardless of whether by risk-based assessment, challenge question, or otherwise, the ACS 124 generates, at 320, an IAV for the transaction, which includes, for example, the log or the uncompressed amount, the truncated hash of the merchant ID, and a currency code for the transaction, etc. In general, in this exemplary embodiment, the IAV will contain 4 bytes of value comprising a cryptographically generated HMAC value. That said, it should be appreciated that other cryptographic techniques may be employed to generate the IAV in other embodiments. And, the IAV is then transmitted, by the ACS 124, to the directory server 118, at 322 (whereby the directory server 118 receives the IAV).

Conversely, if the authentication of the consumer 102 fails, the ACS 124 communicates an authentication failure to the directory server 118 (or, potentially, responds otherwise, as prescribed by the issuer 104, for example), which is passed to the MPI 114 (or 3DS server) and the merchant 106 (whereby the merchant 106 may halt or decline the transaction, etc.).

Figure 4:
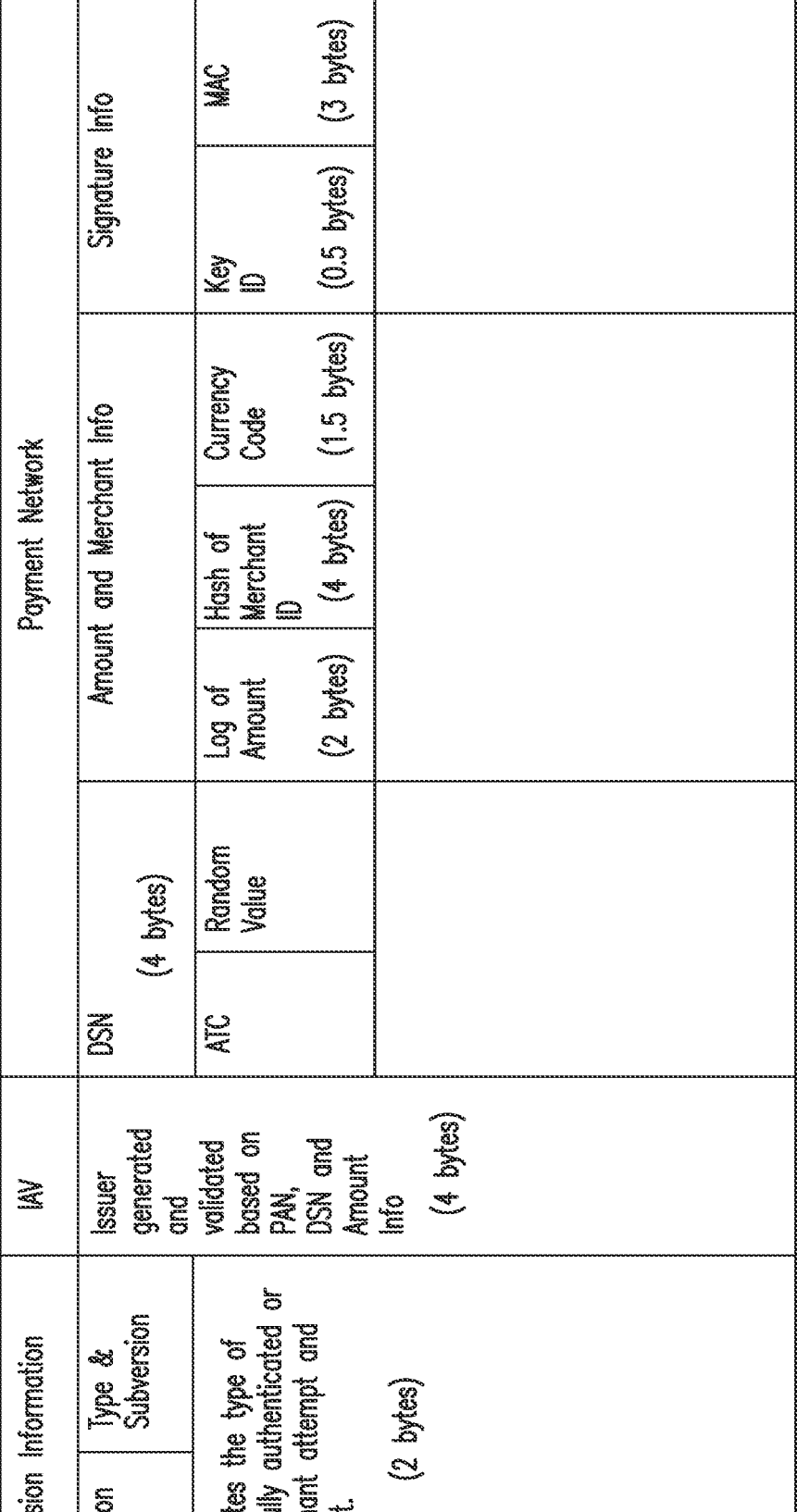
FIG. 4 is a block diagram of an exemplary format of a full AAV, including an IAV, that may be used in connection with the system of FIG. 1 and/or the method of FIG. 3.

Next, the directory server 118 generates, at 324, a MAC and compiles, at 326, a full AAV for the transaction. Specifically, in this exemplary embodiment, the directory server 118 combines the IAV (received from the ACS 124), the DSN, the log amount, the currency code, and the truncated hash of the merchant ID (and potentially other management data), and then generates the MAC (e.g., based on the above data, a symmetric key and a cryptographic function, etc.), etc. The directory server 118 compiles the above data and the MAC into the full AAV. FIG. 4 illustrates a block diagram of an exemplary full AAV 400, which includes 21 bytes of binary data. Specifically, the IAV includes 4 bytes, the DSN includes 4 bytes, the log amount includes 2 bytes, the truncated hash of the merchant ID includes 4 bytes, the currency code includes 1.5 bytes, the key ID (i.e., the identifier of the shared key used to generate the MAC) includes 0.5 bytes, and the MAC includes 3 bytes. The full AAV 400 further includes 2 bytes of version information, which indicates, for example, the type of the IAV as being fully authenticated, merchant attempt and format, or otherwise, etc. With that said, it should be appreciated that the full AAV 400 may include the same or different data in other embodiments, in one or more different formats and/or in one or more different sizes, but will generally include at least the IAV and DSN to facilitate further operations (as described below).

The directory server 118 then transmits, at 328, the full AAV to the merchant 106, and specifically, to the MPI 114 (or the 3DS server).

In turn, although not shown in FIG. 3, the merchant 106 compiles and transmits an authorization request for the transaction to the acquirer 132, with the full AAV included therein. In one particular example, the full AAV is included in the UCAF, which is at data element (DE) 48 of the ISO 8583 authorization request. The compiled authorization request generally includes other data conventionally found in an authorization request (e.g., merchant ID, consumer name, transaction amount, payment account credential(s), etc.). The authorization request is then passed from the acquirer 132, and received at the payment network 136, at 330.

Upon receipt of the authorization request, the payment network 136 validates, at 332, the full AAV by, specifically, validating the MAC included in the full AAV. In particular, the payment network 136 locates the shared key upon which the MAC was generated by the directory server 118, based on the key ID in the full AAV. The payment network 136 then generates the MAC based on the shared key and data included in the full AAV (consistent with the data relied on by the directory server 118 to generate the MAC at 324). Once generated, the payment network 136 matches the MAC to the MAC included in the full AAV, thereby validating the MAC and/or the full AAV. The MAC is validated, in this embodiment, before permitting the authorization request to pass to the issuer 104. That said, it should be appreciated that further validation and/or testing of the full AAV may be included here in other embodiments (e.g., based on the version information in the full AAV, etc.).

Once validated, the payment network 136 transmits the authorization request, including the token (or account number, as applicable) and the DSN, or optionally, the full AAV, to the DSS 110, at 334. Upon receipt, the DSS 110 either confirms the validation of the DSRP cryptogram, based on the DSN (when validated at 308), or validates the DSRP cryptogram, based on the DSRP data included in memory (e.g., in memory 204, etc.) and located based on the DSN, at 336. In addition, the DSS 110 maps the token included in the authorization request to the associated account number (e.g., PAN, etc.), at 338. Thereafter, the DSS 110 returns the account number and a result of the validation to the payment network 136, at 340. In turn, the payment network 136 sends the authorization request to the issuer 104, at 342, including at least the account number, a confirmation of validation of the DSRP cryptogram, and data from the full AAV including the IAV.

In response, the issuer 104 validates the IAV based on a shared key between the issuer 104 and the ACS 124 (i.e., the key used to generated the IAV), and, potentially, performs one or more financial assessments for the transaction, at 344. The additional financial assessments may be provided on any conventional or other basis (e.g., based on whether the consumer's payment account is in good standing, whether the payment account includes sufficient funds/credit, fraud scoring, etc.). Once the transaction is validated and/or approved, the issuer 104 compiles an authorization response for the transaction and transmits the authorization response, at 346, back to the payment network 136. The payment network 136 then transmits, at 348, the authorization response to the merchant 106, via the acquirer 132. Conversely, if the validation of the transaction fails, the issuer 104 may decide to assume the risk and proceed in the transaction, via the appropriate authorization response, or decline the transaction, again, through the authorization response, transmitted back to the merchant 106, as described above.

While the method 300 is described with reference to use of the token in the transaction, it should be appreciated that the method 300 is also applicable to transactions wherein the authorization request includes a PAN or other account number in place of a token, whereby certain steps related specifically to handling of the token and/or mapping of the token to an account in the method 300 may be omitted. What's more, when the token is unknown or unregistered to the directory server 118 and/or the DSS 110, thereby precluding token-account number mapping, the issuer 104 and/or the ACS 124 may instead handle the token. In this variation, while generally consistent with the description above, once the cryptogram is provided, the ACS 124 will communicate with another DSS associated with the given token (not shown) to perform cryptogram validation and other token services. In addition, the ACS 124 may generate the DSN (rather than relying on the directory server 118), which is then returned to the directory server 118 along with the IAV, for use as described herein.

In view of the above, the systems and methods herein provide validation in two different domains through the full AAV. In particular, for example, the AAV is segregated into the IAV, which is generated and validated in an ACS/issuer domain, and into other data, which is generated and validated in a payment network domain. By segregating the AAV in this manner, the systems and methods herein permit the issuer 104 and ACS 124 to inhibit fraudulent transactions through the IAV, which is independent of operations performed to generate and validate the other data associated with the AAV. As such, the payment network 136, directory server 118, and/or DSS 110 may be changed to alter and/or improve security and/or functionality herein, generally, without affecting the operation and/or interaction of the issuer 104 and the ACS 124 (e.g., insulating the IAV from format changes or other details of the UCAF, etc.). What's more, the payment network 136 is able to provide validation of the transactions, as described above, and provide such validation to the issuer 104 as further data associated with approval or decline of the transactions.

It should be appreciated that the above is a departure from a conventional AAV, where the ACS 124 generates the entire AAV, which could then be validated by the issuer 104 only (as the ACS used issuer keys for such generation). Also, as is apparent from the description above, the shared key(s) used to generate and validate the IAV (i.e., the issuer and ACS keys) are not required to be shared with the directory server 118 (or the payment network 136), and conversely, the key(s) used by the directory server 118 and/or the payment network 136 to generate and validate the MAC do not need to be shared with the ACS 124 and/or the issuer 104. In this way, key management in the systems and methods herein is streamlined and simplified.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by at least one computing device, an authentication request for a transaction associated with a payment account, the authentication request including a token associated with the payment account and a cryptogram; (b) mapping, by the at least one computing device, the token to a primary account number (PAN) for the payment account; (c) validating, by the at least one computing device, the cryptogram; (d) generating, by the at least one computing device, a directory server nonce (DSN) for the authentication request; (e) transmitting, by the at least one computing device, the DSN and the account number to an access control server (ACS) associated with an issuer of the payment account; (f) in response to an issuer authentication value (IAV), compiling, by the at least one computing device, an accountholder authentication value (AAV), the AAV including the IAV, the DSN, and an amount of the transaction; (g) transmitting the AAV to one of a merchant and a server, thereby permitting the merchant to compile and transmit an authorization request for the transaction including the AAV, and permitting the issuer to validate the IAV prior to approving the transaction; (h) compressing at least one of an amount of the transaction and a merchant ID associated with the merchant; (i) generating, by the at least one computing device, a message authentication code (MAC), the AAV including the MAC; (j) validating the MAC in response to an authorization request including the AAV; (k) mapping the token to the PAN after validating the MAC, and transmitting the authorization request with the PAN and a validation result to the issuer of the payment account; (1) generating, by the ACS, the IAV based on a key and at least the PAN and the DSN; and (m) validating, by an issuer computing device, the IAV based on the shared key and at least the PAN and the DSN.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for authenticating a user to a payment account in connection with a transaction, the system comprising:
    a directory server, wherein the directory server is configured to:
        receive an authentication request for the transaction associated with the payment account, the payment account associated with an account number, and the authentication request including at least one of a token associated with the payment account and the account number;
        transmit the at least one of the token and the account number to a digital service server (DSS), which is separate from the directory server;
        receive, from the DSS, a directory server nonce (DSN) for the authentication request;
        transmit the DSN and the account number to an access controller server (ACS) associated with an issuer of the payment account, the ACS being separate from the directory server and the DSS;
        receive an issuer authentication value (IAV) from the ACS;
        in response to receiving the IAV, compile an accountholder authentication value (AAV), the AAV including the IAV, the DSN, and at least one of a merchant identifier, a currency code and an amount of the transaction; and
        transmit the AAV to a server associated with an entity involved in the transaction, whereby the entity is permitted to include the AAV in an authorization request and the issuer is permitted to validate the IAV, prior to approving the transaction.

2. The system of claim 1, further comprising:
    the DSS coupled in communication with the directory server, wherein the authentication request includes the token for the payment account, and wherein the DSS is further configured to map the token to the payment account number for the account, prior to transmitting the account number to the directory server.

3. The system of claim 2, wherein the authentication request includes a cryptogram, and wherein the DSS is configured to validate the cryptogram prior to transmitting the DSN to the directory server.

4. The system of claim 1, further comprising:

the DSS coupled in communication with the directory server, wherein the authentication request includes a cryptogram, and wherein the DSS is configured to:

store the cryptogram in memory prior to transmitting the DSN to the directory server;

locate the cryptogram in the memory based on the DSN; and validate the cryptogram in response to the authorization request including the AAV.

5. The system of claim 1, wherein the AAV includes the merchant identifier and the amount of the transaction, wherein the amount of the transaction includes a logarithmic amount of the transaction, and wherein the merchant identifier includes a hash of the merchant identifier.

6. The system of claim 1, wherein the directory server is further configured to generate a message authentication code (MAC) based on at least the DSN, wherein the AAV includes the MAC, and wherein the system further comprises a payment network configured to:

receive the authorization request including the AAV;

validate the MAC based on a shared key with the directory server; and transmit the authorization request, or part thereof, to the DSS.

7. The system of claim 6, further comprising:

the DSS coupled in communication with the directory server, wherein the DSS is configured to:

generate the DSN for the authentication request;

transmit the DSN and the account number for the payment account to the directory server; and validate a digital secure remote payment (DSRP) cryptogram included in the authentication request and to provide a validation result for the DSRP cryptogram to the payment network; and the payment network is configured to;

transmit the authorization request, including the validation result, to the issuer of the payment account.

8. The system of claim 1, wherein the DSN includes at least an application transaction count (ATC) and a randomly generated value.

9. The system of claim 1, wherein the AAV includes the amount of the transaction, which is a logarithmic amount of the transaction, and wherein the AAV includes the IAV, the DSN, the logarithmic amount, a hash of the merchant identifier for the entity, the currency code, a key ID for a shared key and a MAC generated by the shared key.

10. A computer-implemented method for authenticating a user to a payment account in connection with a transaction, the method comprising:

receiving, by a directory server, an authentication request for the transaction associated with the payment account, the payment account associated with an account number, and the authentication request including at least one of a token associated with the payment account and the account number;

transmitting, by the directory server, the at least one of the token and the account number to a digital service server (DSS), which is separate from the directory server;

receiving, by the directory server from the DSS, a directory server nonce (DSN) for the authentication request;

transmitting, by the directory server, the DSN and the account number to an access controller server (ACS) associated with an issuer of the payment account, the ACS being separate from the directory server and the DSS;

receiving, by the directory server, an issuer authentication value (IAV) from the ACS;

in response to receiving the IAV, compiling, by the directory server, an accountholder authentication value (AAV), the AAV including the IAV, the DSN, and at least one of a merchant identifier, a currency code and an amount of the transaction; and transmitting, by the directory server, the AAV to a server associated with an entity involved in the transaction, whereby the entity is permitted to include the AAV in an authorization request and the issuer is permitted to validate the IAV, prior to approving the transaction.

11. The computer-implemented method of claim 10, wherein the authentication request includes the token for the payment account, and wherein the method further comprises mapping, by the DSS, the token to the account number for the account, prior to transmitting the account number to the directory server.

12. The computer-implemented method of claim 11, wherein the authentication request includes a cryptogram, and wherein the method further comprises validating, by the DSS, the cryptogram prior to transmitting the DSN to the directory server.

13. The computer-implemented method of claim 10, wherein the authentication request includes a cryptogram, and wherein the method further comprises:

storing, by the DSS, the cryptogram in memory prior to transmitting the DSN to the directory server;

locating, by the DSS, the cryptogram in the memory based on the DSN; and validating, by the DSS, the cryptogram in response to the authorization request including the AAV.

14. The computer-implemented method of claim 10, wherein the AAV includes the merchant identifier and the amount of the transaction, wherein the amount of the transaction includes a logarithmic amount of the transaction, and wherein the merchant identifier includes a hash of the merchant identifier.

15. The computer-implemented method of claim 10, further comprising:

generating, by the directory server, a message authentication code (MAC) based on at least the DSN, wherein the AAV includes the MAC;

receiving, by a payment network, the authorization request including the AAV;

validating, by the payment network, the MAC based on a shared key with the directory server; and transmitting, by the payment network, the authorization request, or part thereof, to the DSS.

16. A non-transitory computer-readable storage medium storing computer-executable instruction that, when executed by a director server, cause the director server to:

receive an authentication request for a transaction associated with a payment account, the payment account associated with an account number, and the authentication request including at least one of a token associated with the payment account and the account number;

transmit the at least one of the token and the account number to a digital service server (DSS), which is separate from the directory server;

receive, from the DSS, a directory server nonce (DSN) for the authentication request;

transmit the DSN and the account number to an access controller server (ACS) associated with an issuer of the payment account, the ACS being separate from the directory server and the DSS;

receive an issuer authentication value (IAV) from the ACS;

in response to receiving the IAV, compile an accountholder authentication value (AAV), the AAV including the IAV, the DSN, and at least one of a merchant identifier, a currency code and an amount of the transaction; and transmit the AAV to a server associated with an entity involved in the transaction, whereby the entity is permitted to include the AAV in an authorization request and the issuer is permitted to validate the IAV, prior to approving the transaction.

17. The non-transitory computer-readable storage medium of claim 16, wherein the AAV includes the merchant identifier and the amount of the transaction, wherein the amount of the transaction includes a logarithmic amount of the transaction, and wherein the merchant identifier includes a hash of the merchant identifier.

* * * * *